Patented Dec. 30, 1930

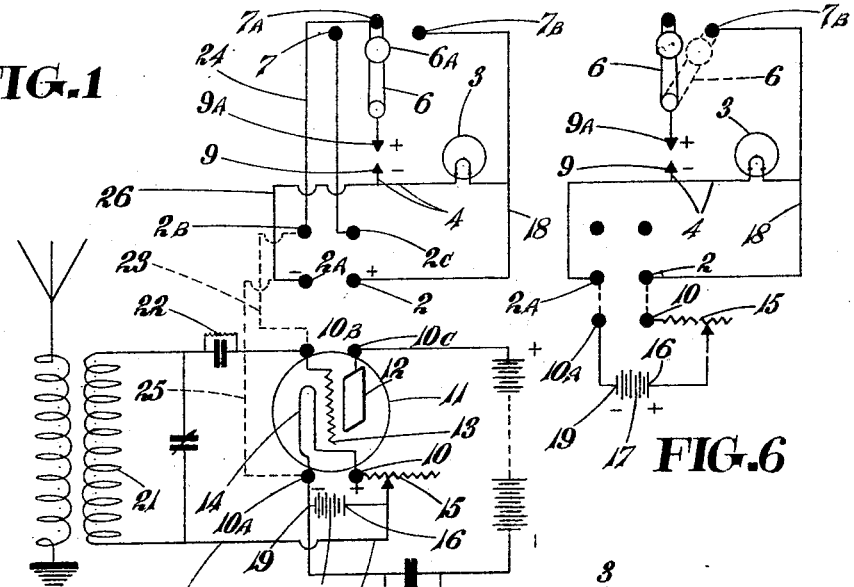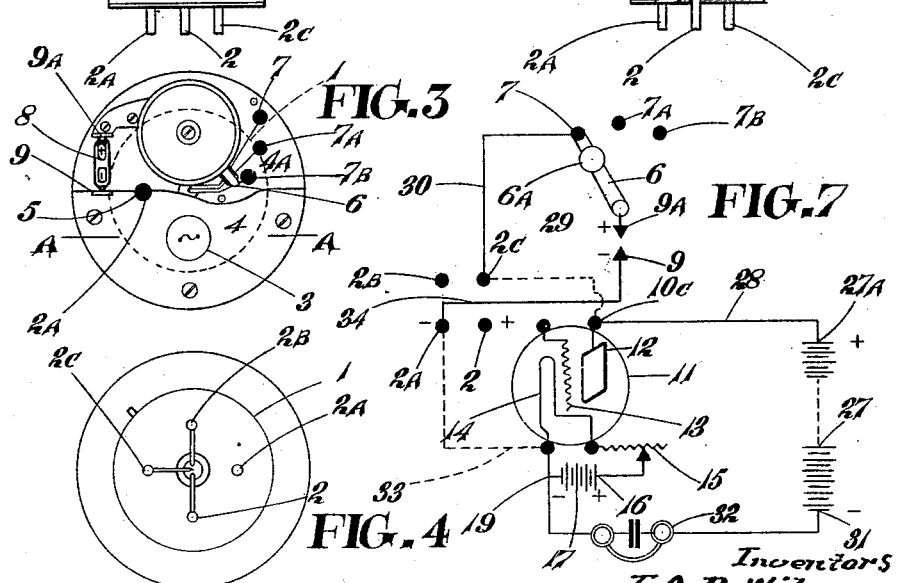

1,786,555

UNITED STATES PATENT OFFICE

THOMAS ALEXANDER DONALD WILSON AND ERNEST REYNOLDS, OF DUNEDIN, NEW ZEALAND

RADIO CIRCUIT TESTING UNIT

Application filed March 12, 1926. Serial No. 94,238.

This invention relates to radio receiving apparatus in which the standard vacuum tube socket of the well known bayonet and plug type is used.

It has been found in practice, on experimenting with various radio circuits, that the wiring is sometimes accidentally wrongly connected, with the result that the filament of the vacuum tube is burnt out, or badly damaged due to the high voltage battery, hereinafter referred to as the B battery, being connected in such a manner to be in series with the filament, or further, an incorrectly connected (B) battery in a detector circuit would prevent the vacuum tube from functioning, because as soon as the filament of the tube is heated to incandescence by current from the filament battery, hereinafter referred to as the (A) battery, and the intensity of the current correctly regulated by means of the rheostat, negatively charged electrons being omitted from the filament would be immediately attracted to the plate of the valve, due to the fact that this element is, if the circuit is correct, connected to the positive pole of the (B) battery and upon the polarity of the (B) battery being reversed, attraction for the negative electrons would stop.

The instrument when used in conjunction with the majority of the well known receiving circuits, may be used with advantage to test the entire set without removing it from the vacuum tube socket.

The object of our invention is to prevent possible damage to vacuum tubes in the manner hereinbefore described.

The method of testing for continuity of radio circuits and for voltage and polarity, consists in the application of an instrument to a vacuum tube socket of a radio set to form contact with the positive and negative terminals, and with the plate and grid terminals on the said vacuum tube socket.

Referring to the accompanying drawings.

Figure 1 is a wiring diagram of a simple detector circuit, having in combination therewith the complete wiring of the testing instrument; it being the intention to indicate clearly by means of Figure 1 the testing of the grid circuit of a radio receiving set.

Figure 2 is an elevation of the instrument ready for inserting into the valve socket.

Figure 3 is a plan of Figure 2.

Figure 4 is a bottom plan of Figure 2.

Figure 5 is a sectional elevation through line A—A in Figure 3, showing the relation of the various contact legs.

Figure 6 is a wiring diagram showing how the voltage and polarity of the A battery circuit is tested.

Figure 7 is a wiring diagram showing how the plate or B battery circuit is tested.

First describing the testing instrument.

There is a base member 1 constructed from wood or other suitable insulating material, which is dimensioned to fit the ordinary bayonet and plug type of vacuum tube socket, and in reality replaces the base of the ordinary vacuum tube.

In the accompanying drawings, Figures 2, 3, 4, and 5 have the base thereof designed for the bayonet socket, but with slight alteration to the position of the contact legs, the instrument may be used with the plug socket. As an alternative, however, the well known valve adapter may be used in conjunction with the bayonet valve base to achieve this purpose. The said base 1 is furnished with four contact legs 2, 2A, 2B and 2C, which on being inserted into the vacuum tube socket are adapted to make contact i. e. with the four terminals thereof, which are more fully referred to later, the legs 2 and 2A representing the filament contact legs of the ordinary bayonet type valve, the leg 2 being hereinafter termed the "positive" leg or + while the leg 2A will be regarded as the negative contact leg or —.

The leg 2 is preferably a tight fit in the base 1 and forms a direct contact with the end of the flash lamp bulb 3, which screws into a metal plate or conductor 4, which forms a socket for the lamp 3 and is secured by screws to the top 4A of the base 1.

The leg 2A passes completely through the base 1 and terminates by being soldered or otherwise secured to the metal plate 4 as at 5 in Figures 2, 3 and 5 of the accompanying drawings.

The legs 2B and 2C represent the grid and plate contact legs of the ordinary valve base plate respectively. There is a switch contact spring 6 controlled by the knob 6A and adapted to make contact with the contact points 7, 7A and 7B by slight turning of the knob 6A, the contact points 7, 7A and 7B being spaced concentric with the knob 6A and at such intervals apart to avoid any likelihood of short circuits by the switch spring coming temporarily in contact with two of the points 7, 7A and 7B at one time.

There is a polarity indicator 8 permanently connected, if desired, between the metal plate 4 and the switch contact spring 6, and the instrument is so wired that the negative pole of each circuit, namely, the filament, grid, plate or (B) battery circuits, will be registered at a predetermined end of the polarity indicator 8, in this instance marked — or negative in Figure 3 of the accompanying drawings. As is well known, the most common forms of polarity indicators comprise a tube containing a solution of phenolphthalein and sodium sulphate with two electrodes hermetically sealed in the ends of the said glass tube, so that on application of an electric current thereto, and in series therewith a visible red effervescence is given off at the negative electrode.

As an alternative, pole finding paper may be used in preference to a permanent polarity indicator. In this case the contact springs 9 and 9A projecting slightly from the top 4A of the base 1 and preferably pointed, would have brought in contact therewith a piece of pole finding paper made slightly damp in the usual manner. On testing a circuit in this way the piece of paper in contact with the protruding contact spring 9 would be impinged by a red spot, indicating negative polarity, as in the prior instance where the polarity indicator 8 was used.

Pole finding paper is a well known electrical accessory and generally consists of unsized paper, which will imbibe a liquid readily. This is saturated with a solution of phenolphthalein or sodium sulphate and allowed to dry, being afterwards made up into small booklets. When it is necessary to use the paper it may be conveniently dampened by placing on the tongue for a second or two, when it will be ready for the test.

In operation, the instrument is placed in the valve socket of the radio set in precisely the same manner as an ordinary valve would be, in fact the arrangement of the legs is an exact duplicate of that adopted with the ordinary valve base, with the result that the legs 2, 2A and 2C exactly coincide with the vacuum tube socket contact 10, 10A, 10B and 10C respectively. A simple receiving detector circuit for the purpose described is shown in Figure 1. This circuit may be conveniently sub-divided into what are commonly known as the filament, grid, plate or B battery circuits.

Referring primarily to the filament circuit.

There is a diagrammatical representation of a vacuum tube 11, representing the plate 12, the grid 13 and the filament 14 of the vacuum tube.

To test the filament of (A) battery circuit, particularly in the case of a high voltage B battery being already in circuit the vacuum tube rheostat 15 is turned slightly to ascertain whether any mistake in the wiring has occurred, which would impair the filament of a vacuum tube had it been placed into the socket; thus an inexpensive lamp only would be lost instead of a costly vacuum tube valve.

In an experiment with the instrument, an ordinary five volt flash lamp was used and was found to serve quite well with a six or eight volt (A) battery and rheostat in series therewith. Figure 6 of the accompanying drawings indicates the (A) battery circuit under test.

Describing the said test; current will flow from the positive terminal 16 of the A battery 17 through the rheostat 15 to the contact point 10, with which coincides the leg 2 of the instrument. Current then traverses the conductor 18 and passes through the filament of the lamp 3, thence through the metal plate or conductor 4 to the contact leg 2A, thence to pass by way of the contact 10A which coincides therewith to the negative terminal 19 of the (A) battery 17 completing the circuit, and bringing the lamp 3 to incandescence.

To test the polarity of the (A) battery, the contact spring 6 is placed into contact with the contact point 7B connected to the leg 2 of the instrument, and a piece of suitably prepared polarity indicator is placed across the contact points 9 and 9A. On current being allowed to pass through the circuit the negative pole 19 of the (A) battery 17 will be registered at the contact spring 9, indicating negative polarity by the presence of a red spot impinged upon the pole finding paper and thus indicating its true relative polarity, with the rest of the radio set.

The grid circuit is tested for continuity by placing the contact spring 6 in contact with the contact point 7A as indicated in Figure 1 of the accompanying drawings, and a piece of pole finding paper is applied to the points 9 and 9A as in the previous test. Current from the (A) battery 17 passes from the positive terminal 16 thereof by way of the conductor 20 through the secondary tuning coil 21 and by way of the grid leak 22 to the contact point 10B of the vacuum tube socket; the broken line 23 indicating that leg 2B of the instrument coincides with the contact 10B of the valve socket. Current then passes through the conductor 24 to the contact 7A, through the switch contact spring 6 to the positive side 9A of the pole finder. From the contact 10A of the vacuum tube socket a negative flow of current passes to the leg 2A as indicated by the broken line at 25, and thence by way of the conductor 26 to the negative pole 9 of the polarity indicator.

After the lapse of some minutes the grid circuit, if not short circuited in any way, will be indicated as before, while on the other hand too speedy an appearance of color will indicate a short circuit.

The plate of (B) battery circuit Figure 7, may also be tested for continuity, and for polarity of the (B) battery 27. Current flows from the positive terminal 27A of the battery 27 along the conductor 28 to the contact 10C of the valve socket, the broken line 29 indicating its contact with the leg 2C of the instrument. Current will pass to the contact point 7 by way of the conductor 30, and thence through the switch contact spring 6 to the positive contact spring 9A of the polarity indicator. Starting from the negative pole 31 of the (B) battery 27 a negative current will pass through the telephones 32 to the negative pole 19 of the (A) battery 17, and as indicated by the broken line 23 to the leg 2A of the instrument and thence through the conductor 34 to the negative contact spring 9 of the polarity indicator. Thus the polarity of the (B) battery 27 and the continuity of the plate circuit is tested simultaneously.

If desired, the polarity indicator 8 may be completely abandoned for the cheaper and more practical method of using pole finding paper, and a spring clip suitably insulated may be used to retain the paper on the pointed contact points 9 and 9A during a test.

It is not desired to limit the scope of the invention to the precise detail of construction here related, various modifications being conceivable while not departing from the scope of the invention.

What we claim as new and desire to secure by Letters Patent is:—

1. A testing unit comprising an insulating member adapted to cooperate with the vacuum tube socket of a radio set, four contact legs carried by said member and projecting below the same to electrically engage with the terminals of said socket, a metal plate carried by the upper surface of the member, a lamp socket on the upper surface of the member with one side in electrical connection with said plate and the other side in electrical connection with one of said legs, said plate being electrically connected with another of said legs, the remaining legs carried by the member being designed to electrically engage the grid and plate terminals of the socket respectively, contacts carried by and insulated from said plate and forming terminals of said last named remaining legs and of the leg connected to said plate, a polarity tester carried by and in electrical connection with said plate, and means also in electrical connection with said polarity tester and operative to selectively engage either of said contacts.

2. A testing unit comprising an insulating member adapted to cooperate with the vacuum socket of a radio set, four contact legs carried by said member and projecting below the same to electrically engage with the terminals of said socket, a metal plate carried by the upper surface of the member, a lamp socket on the upper surface of the member with one side in electrical connection with said plate and the other side in electrical connection with one of said legs, said plate being electrically connected with another of said legs, the remaining legs carried by the member being designed to electrically engage the grid and plate terminals of the socket respectively, contacts carried by and insulated from said plate and forming terminals of said last named remaining legs and of the leg connected to said plate, a spring contact, manually operable means whereby the spring contact may be selectively engaged with any of said first mentioned contacts, and a polarity tester in electrical engagement with the plate and with said spring contact.

In testimony whereof we have hereunto set our hands.

THOMAS ALEXANDER DONALD WILSON.
ERNEST REYNOLDS.